E. C. MITCHELL.
HOSE CONNECTION TO NIPPLES.
APPLICATION FILED JUNE 30, 1919.
1,346,330.
Patented July 13, 1920.
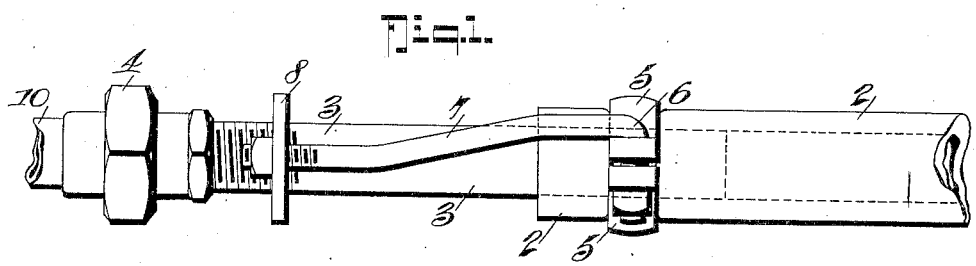
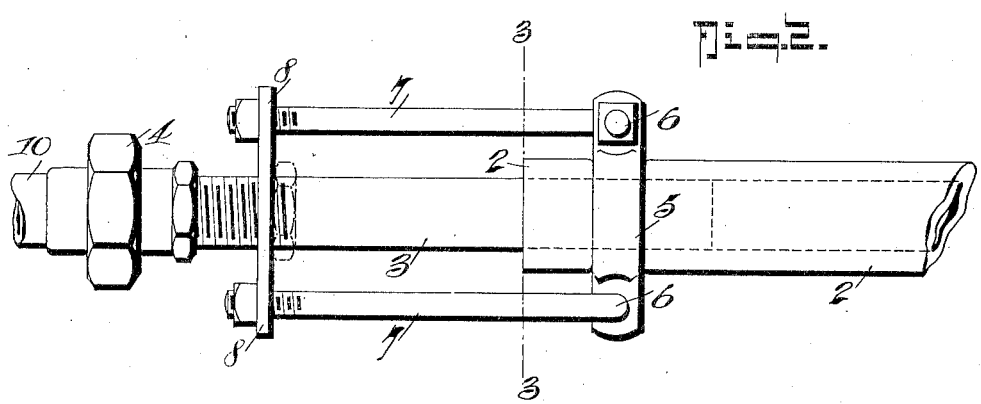
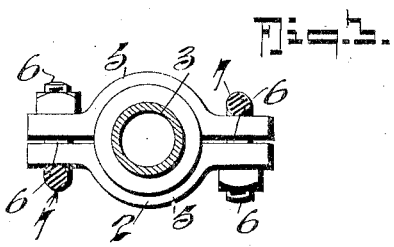
Inventor
Eric C. Mitchell.
By 
Attorneys

UNITED STATES PATENT OFFICE.

ERIC C. MITCHELL, OF VANCOUVER, BRITISH COLUMBIA, CANADA.

HOSE CONNECTION TO NIPPLES.

1,346,330.  Specification of Letters Patent.  Patented July 13, 1920.

Application filed June 30, 1919. Serial No. 307,709.

*To all whom it may concern:*

Be it known that I, ERIC C. MITCHELL, a citizen of the Dominion of Canada, residing at Vancouver, in the Province of British Columbia, Canada, have invented certain new and useful Improvements in Hose Connections to Nipples, of which the following is a specification.

This invention relates to a means for connecting a rubber hose-pipe on to the nipple by which it is connected to the pipe through which water or other fluid is to be delivered, and is designed to afford a positive connection of the pipe to the nipple.

A hose-pipe is usually secured on its nipple by a clamp or band encircling the hose-pipe where the nipple is inserted, whereby the hose-pipe is tightly secured in frictional contact with the outside of the nipple, the surface of which may be circumferentially grooved or corrugated to afford the hose-pipe a better hold against endwise pull.

This means of fastening is, however, insufficient where the hose-pipe is subjected to considerable pressure and they are frequently pulled off. In this invention, which is the subject of this application, the clamp is positively secured to the nipple.

The invention is particularly described in the following specification, reference being made to the drawings by which it is accompanied, in which:

Figure 1 is a side elevation of the connection complete.

Fig. 2 is a plan of the same, and

Fig. 3 is an end elevation of the clamp, being a cross section on the line 3—3 in Fig. 2.

In these drawings 2 represents the hose-pipe and 3 the nipple on and to which it is to be secured, 4 being the union or other device by which the nipple is removably connected to the fluid service pipe 10. The hose-pipe clamp 5 is made in two halves to encircle the hose-pipe where the nipple 3 is inserted in it. The two halves of this clamp are secured together on the hose-pipe and are positively connected to the nipple 3 by stay rods 7, one end of each of which is threaded and secured by a nut in a plate 8 threaded or otherwise secured on the nipple 3, and the other end of each is turned at right angles as at 6 to pass through the ends of the clamp members 5 and is threaded to receive a nut by which the ends of the clamp are drawn together to secure it tightly on the hose-pipe.

The turned ends 6 of the stay rods 7 are preferably introduced from opposite sides through the clamp ends, as shown in Figs. 2 and 3, and for appearance may be offset slightly, as shown in Fig. 1, to bring the nut connection to the plate 8 into the plane of the joint of the clamp 5.

A simple and effective means is thus provided for positively securing the hose-pipe on its nipple and thereby rendering it more safe, especially where a steam pressure is used. The fastening is one that can be quickly made and applied. The plate 8 may, as shown in the drawing, be threaded to take the thread of the nipple or may be drilled to clear the thread and bear against a lock nut on the screw thread of the pipe, as indicated by dot and dash lines in Fig. 2.

Novelty is also claimed for the rods 7 serving the double purpose as stay rods and clamping bolts.

Having now particularly described my invention, I hereby declare that what I claim as new and desire to be protected in by Letters Patent, is:

1. A means for connecting a hose-pipe to its nipple, said means comprising the combination with the hose-pipe and its nipple, of a clamp encircling the outside of the hose-pipe where the nipple is inserted, and bolts with nuts for securing the clamp on the hose-pipe and also for connecting the clamp to a collar secured on the nipple.

2. Means for connecting a hose-pipe to its nipple said means comprising the combination with a hose-pipe and the nipple, of a collar removably secured on the nipple, a clamp encircling the hose-pipe where the nipple is inserted, and stay rods connected to the collar on the nipple the ends of which rods are turned at right angles to form the bolts by which the halves of the clamp are secured together on the hose-pipe.

3. Means for connecting a hose-pipe to its nipple, said means comprising the combination with a hose-pipe and its nipple, of a collar plate threaded on the nipple, a clamp in two halves encircling the hose-pipe where the nipple is inserted, and stay rods connected to the collar plate, the ends of which rods are turned at right angles and threaded to form the bolts by which the halves of the clamp are secured together on the hose-pipe.

In testimony whereof I affix my signature.

ERIC. C. MITCHELL.